Figure 7:
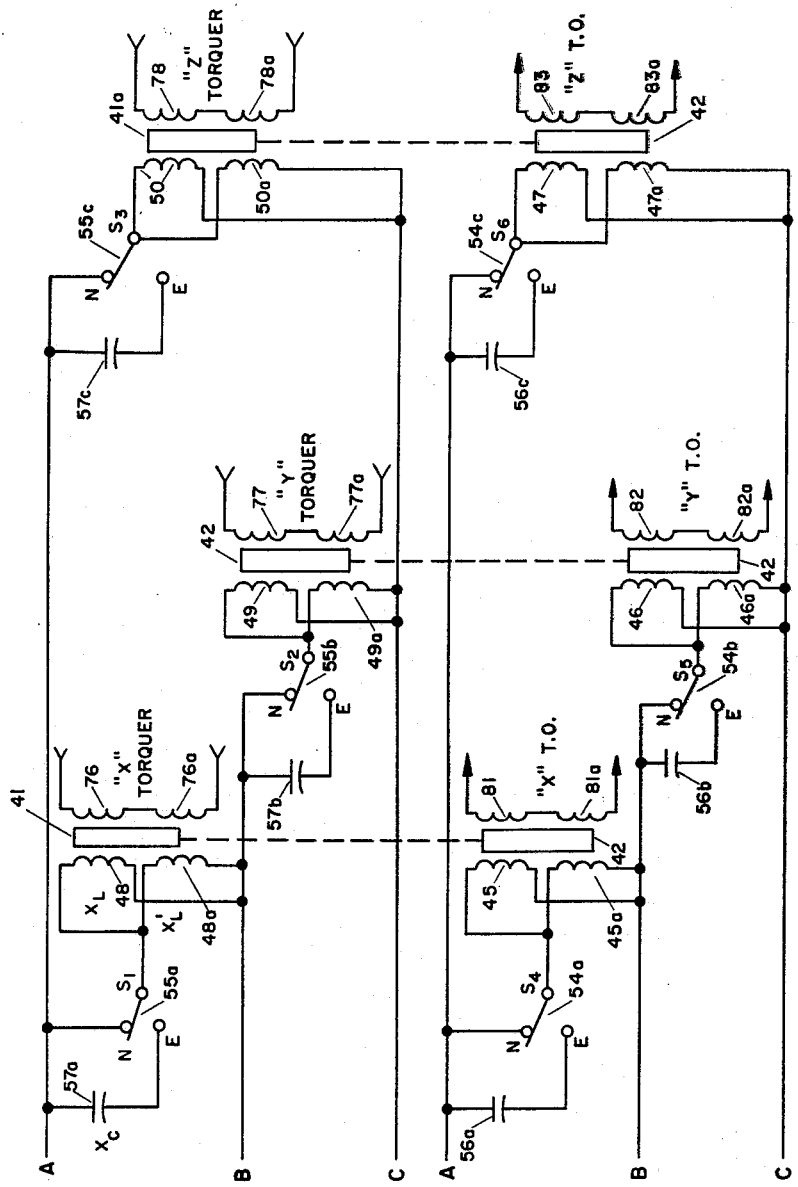

May 18, 1965  R. A. FRYE  3,183,725
TWO-AXIS GAS BEARING GYRO
Filed Feb. 15, 1962  4 Sheets-Sheet 1
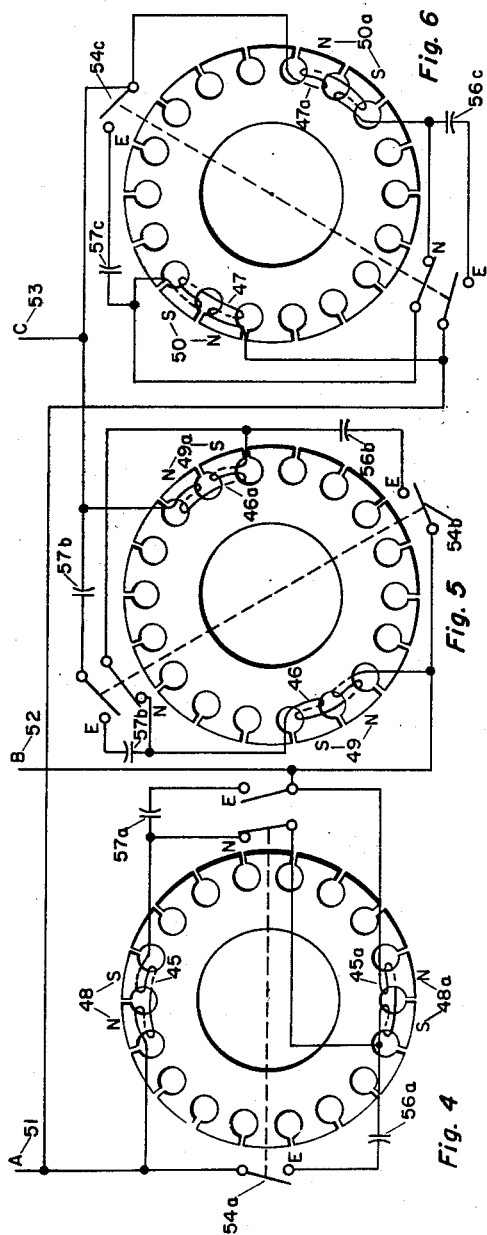
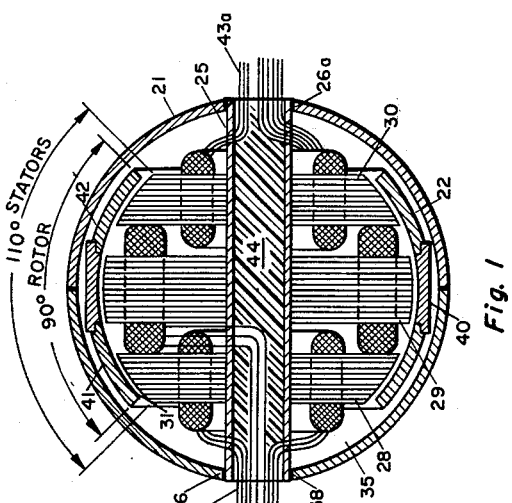
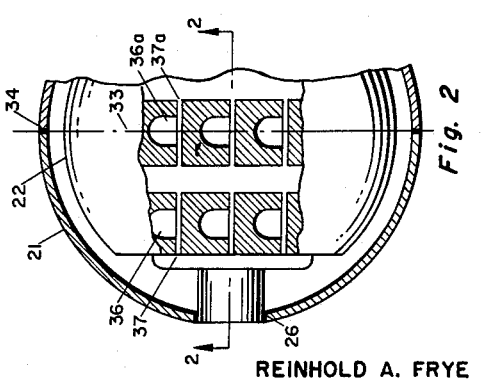
REINHOLD A. FRYE
INVENTOR.
BY
ATTORNEYS

REINHOLD A. FRYE
*INVENTOR.*

BY *S. A. Giarratana*

*ATTORNEYS*

REINHOLD A. FRYE
*INVENTOR.*

BY
ATTORNEYS

May 18, 1965  R. A. FRYE  3,183,725
TWO-AXIS GAS BEARING GYRO
Filed Feb. 15, 1962  4 Sheets-Sheet 4

REINHOLD A. FRYE
INVENTOR
BY
ATTORNEY

United States Patent Office 3,183,725
Patented May 18, 1965

3,183,725
TWO-AXIS GAS BEARING GYRO
Reinhold A. Frye, Little Falls, N.J., assignor to General Precision, Inc., Little Falls, N.J., a corporation of Delaware
Filed Feb. 15, 1962, Ser. No. 173,391
8 Claims. (Cl. 74—5.7)

This invention relates to gyroscopes for use in navigation systems for aircraft and the like, and is particularly directed to a gas bearing supported gyro, which is rotably adjustable about two axes, substantially perpendicular to one another.

It is primarily directed to a gas bearing supported gyro, which is electrically driven and independently adjustable about two axes.

A primary feature of the invention is that the gyro is equipped with a generally spherical stator having a plurality of coils, a hollow substantially spherical rotor being fitted to the outer surface of the stator, the rotor being gas supported and angularly adjustable about two mutually perpendicular axes under control of the windings supported by the stator.

A primary object is to provide a constrained rotor, gas bearing gyro fitted with an electromechanical transducer for detecting angular displacement of the rotor about two axes substantially perpendicular to one another, and an electromechanical torquer, which can apply torque about two other orthogonal axes.

Another feature is that the magnetic air gap between the hollow spherical rotor and the stator is used as a gas bearing area.

Another feature of the invention is that the winding slots of an externally wound motor stator section are used as gas passages for the gas bearings.

Another feature is that two electromagnetic stator windings are provided to lift and orient the hollow spherical rotor into its normal spinning attitude prior to rotation of the rotor.

Another object is to provide a constrained rotor gas bearing gyro equipped with a motor stator section for providing the driving torque required to overcome the viscous friction generated in the gas bearing.

The accompanying drawings, illustrative of one embodiment of the invention, together with the description of its construction and the method of operation, control, adjustment, application, and utilization thereof will serve to clarify further objects and advantages of the invention.

In the drawings:
FIGURE 1 is a cross-section through the laminated torquer and pick-off stator sections of the gyro shown in FIGURE 2 and the hollow spherical segmental rotor surrounding the stator sections, the section being taken on the line 1—1, FIGURE 2.
FIGURE 2 is a partial section through the outer housing of the gyro shown in FIGURE 1, the housing being cut away to show the pockets formed in the stator sections to retain the gas for supporting the rotor of the gyro.
FIGURE 3 is a partial cross-section and partial end elevation of the gyro shown in FIGURES 1 and 2, showing the rotor and the arrangement of the take-off coils supported by the stator.
FIGURE 4 is a schematic diagram illustrating the arrangement of the windings of the gyro and the relative position of the two pairs of poles connected to the windings.
FIGURE 5 is a schematic diagram similar to FIGURE 4 showing a second set of windings and a set of poles connected to the windings.
FIGURE 6 is a schematic diagram similar to FIGURES 4 and 5, illustrating the position of the third set of windings and poles of the gyro.

Figure 8:
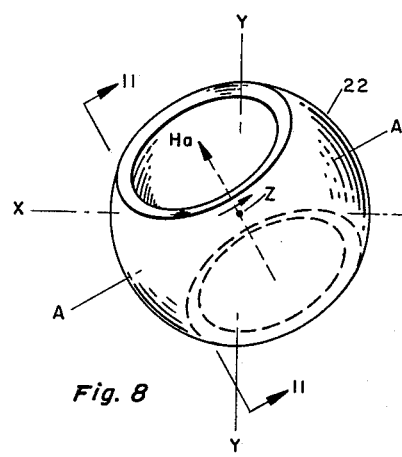
Figure 11:
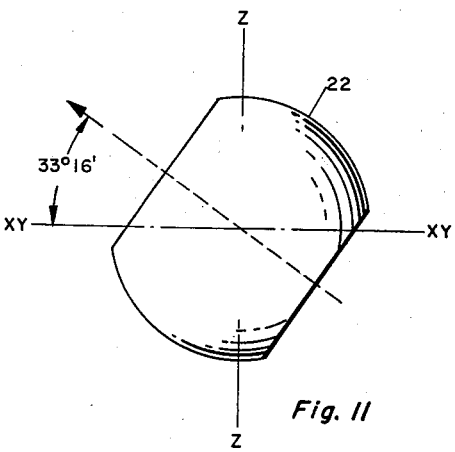
Figure 9:
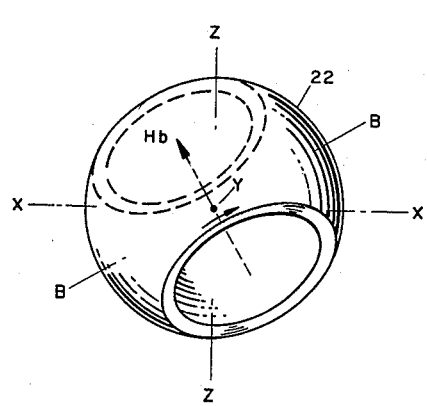
Figure 10:
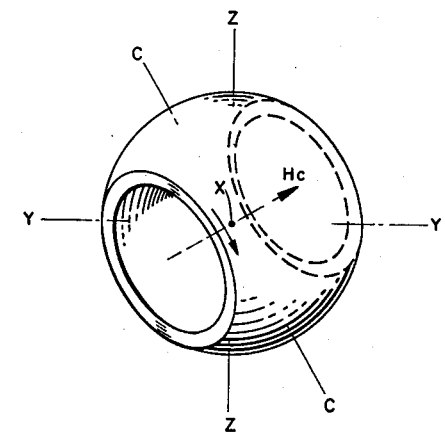
Figure 14:
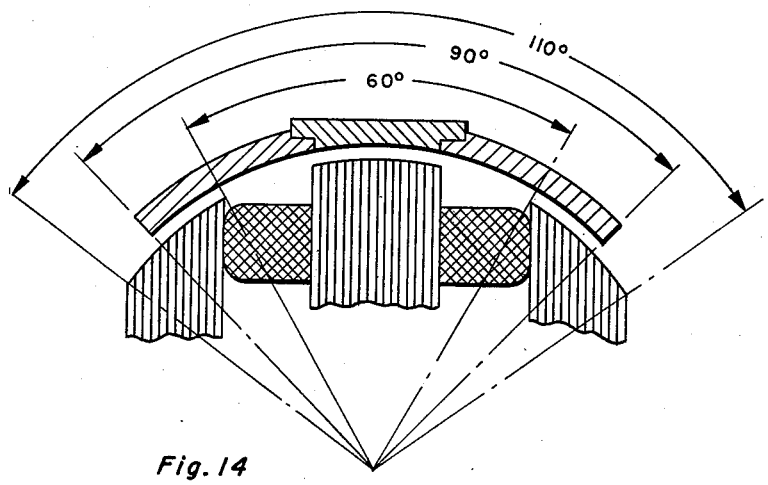
Figure 12:
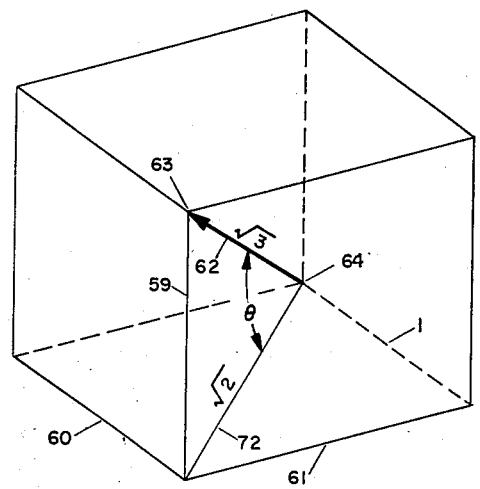
Figure 13:
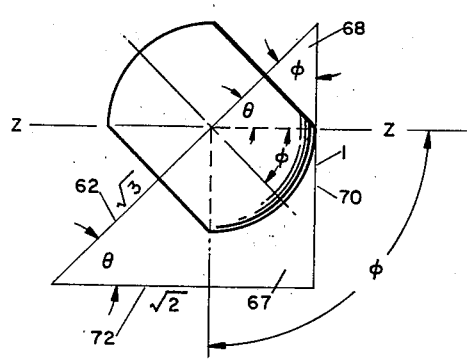

FIGURE 7 is a schematic wiring diagram showing the method of electrically connecting the take-off windings to generate the take-off signals and the method of connecting the torquer windings to apply torque to the rotor of the gyro.
FIGURE 8 is a modified perspective view of the rotor of the gyro shown in FIGURES 1 and 2, showing the relation between the angular momentum vector and the plane of the X-Y axes of the rotor.
FIGURE 9 is a modified perspective view, similar to FIGURE 8, showing the angular momentum vector and the axis about which the gyro tends to precess.
FIGURE 10 is a modified perspective view of the rotor, similar to FIGURE 8, with the rotor displaced from the position shown in FIGURE 9, showing another axis about which the gyro tends to precess.
FIGURE 11 is a schematic side elevational view of the rotor of the gyro shown in FIGURES 1 and 2, showing the angular inclination of the angular momentum vector relative to the plane of the X-Y axes of the rotor.
FIGURE 12 is a schematic diagram showing the method of visualizing the angle shown in FIGURE 11.
FIGURE 13 is a schematic diagram showing the method of computing the angles shown in FIGURES 11 and 12.
FIGURE 14 is a schematic diagram showing the method of indicating and determining the air-gap area between the rotor and the pick-off section of the stator.

It will be understood that the following description of the construction and the method of control, wiring, operation, and utilization of the "Two-Axis Gas Bearing Gyro" is intended as explanatory of the invention and not restrictive thereof.

In the drawings, the same reference numerals designate the same parts throughout the various views, except where otherwise indicated.

One embodiment of the construction shown in FIGURES 1 and 2 is mounted within a hollow spherical outer housing 21, a hollow spherical segmental rotor 22 of the gyro being mounted within the outer housing, a relatively large radial gap being formed between the outer surface of the rotor, and the inner surface of the outer housing 21.

The stator of the gyro is supported by a central shaft 25, which passes through diametrically aligned openings 26, 26a through the outer housing.

The stator of the gyro includes a laminated torquer section 28, a laminated motor stator section 29, and a laminated take-off section 30, all of which are supported by the central stator shaft 25, the three stator sections, which are of spherical segmental outer contour, being mounted inside the hollow spherical segmental rotor 22, an air gap 31 being formed between the inner surface of the rotor and the outer surface of the stator sections 28, 29, 30.

In order to assemble the housing to the rotor 22 of the gyro, the hollow spherical housing is formed in two sections which are separated along one axis 33 of the gyro, the two sections being soldered, brazed or otherwise joined along the line 34 which is co-axially aligned with the axis 33.

As shown in FIGURE 2, a plurality of shallow compression pockets 36, 36a is etched or otherwise cut into the outer surface of the torquer section 28 of the stator, the compression pockets 36, 36a being in direct communication with the winding insertion slots 37, 37a through the stator, the slots permitting gas or air confined within housing 21 as hereinafter described to circulate therethrough into the air gap 31 between the stator and the rotor, the gas being adapted to rotatably support the rotor 22 in a manner hereinafter described.

The central shaft 25 of the stator which supports the stator sections 28, 29, 30 is soldered, brazed 38, or otherwise fixedly attached to the outer housing 21 to prevent rotation of the stator.

The rotor 22 consists of three sections which are joined to one another by soldering, brazing, or other suitable attaching means. These sections include a tubular central section 40, which normally surrounds the motor section 29 of the stator, and two hollow spherical segmental side sections 41, 42, which are fixedly attached to the central section by soldering or other suitable means to form the spherical segmental rotor.

The tubular central section 40 of the rotor, which is of spherical segmental inner contour, forms a hysteresis ring which co-acts with the motor section 29 of the stator to rotatably drive the rotor 22. The central section 40 of the rotor is magnetized in operation by the magnetic field generated by the motor section of the stator, thus rotatably driving the rotor in a manner hereinafter described in greater detail.

The two side sections 41, 42 of the rotor, which are of matching spherical segmental form, are fabricated from a highly permeable low hysteresis material such as "Permalloy" or "Supermalloy." These side sections serve as return paths for the magnetic fields produced in the torquer section 28 and the take-off section 30 of the stator.

The multiple electrical leads 43, 43a, which pass through both ends of the central shaft 25 and supply voltage to the three stator sections 28, 29, 30, are brought out through the ends of the tubular support shaft 25, which is subsequently filled with an epoxy resin 44 to provide structural support for the leads and permit sealing the interior of the outer housing 21. The interior of the outer housing 21 is evacuated and filled with an inert gas 35, such as helium, to provide better heat conductivity.

FIGURE 3 is an end elevational view of the gyro shown in FIGURES 1 and 2, with the outer housing 21 shown in section, to show the outer contour of the rotor 22 and the distribution of the take-off stator section 30, the take-off coils being designated $45(x)$, $46(y)$, $47(z)$, the take-off coils forming pairs of magnetic poles at 60° intervals in the take-off stator section 30. In the construction shown in FIGURE 3, there are a total of 12 magnetic poles in the take-off stator section arranged in three groups with four poles in each group. As shown in FIGURES 4, 5, and 6, the poles designated $48(x)$, $49(y)$, and $50(z)$ are located in three groups, each group consisting of two pairs of poles spaced 180° apart.

FIGURE 4 shows the method of applying the take-off winding $45(x)$ to the take-off section 30 of the stator. When the current flows in this winding 45, 45a, two pairs of poles 48, 48a are formed 180° apart by the coils 45, 45a shown in FIGURE 4 and in the wiring circuit, FIGURE 7.

FIGURE 5 illustrates how the Y take-off windings 46, $46a(y)$ form two pairs of poles 49, $49a(y)$, 120° removed from the first pair of poles defined by FIGURE 4.

FIGURE 6 shows how the Z take-off windings 47, $47a(z)$ form a third set of poles 50, $50a(z)$, which are 120° removed from the second pair of poles defined in FIGURE 5.

The three take-off windings $45(x)$, $46(y)$, $47(z)$ shown in FIGURES 4, 5, and 6 are each connected to a source of three-phase voltage designated $51(a)$, $52(b)$, $53(c)$. The time-phase relationship of the currents flowing from $51(a)$ to $52(b)$, $51(a)$ to $53(c)$, and $52(b)$ to $53(c)$ are such that a rotating magnetic field is induced in the rotor side section 42 shown in FIGURE 1. When the switches 54a, 54b, 54c, 55a, 55b, 55c, shown in FIGURES 4, 5, 6, and 7, are thrown to the lower contact designated "E," the excitation current flows through the capacitors, 56a, 56b, 56c, 57a, 57b, 57c. The capacitive reactance of the capacitors 56a, 56b, 56c in series (multiple) with the inductive reactance of the excitation winding 45, 45a, 46, 46a, 47, 47a regulates the relative magnetic intensity of the separately excited pairs of poles $48(x)$, $49(y)$, $50(z)$. The inductive reactance of the coils 45, 45a, 46, 46a, 47, 47a which form each pair of poles 48, 48a, 49, 49a, 50, 50a varies with the proximity of the rotor side section 42 to the particular winding of the stator section. The inductive reactance of a selected pair of poles 48, 48a, 49, 49a, 50, 50a is a minimum when the radial depth of the air gap is a maximum and/or the projected air gap area is a minimum. The capacitive reactance of the capacitor 56a, 56b, 56c, 57a, 57b, and 57c is selected to exactly equal the inductive reactance of the coils forming a pair of poles when the radial air gap between the rotor 22 and the specific pair of poles 48, 49, 50 is at the maximum permissible value and/or the projected air gap area is a minimum.

When the capacitive and inductive reactances of a circuit are exactly equal, a state of resonance is said to exist. At resonance the impedance of the circuit is at a minimum and the maximum current will flow, thereby producing a magnetic attractive field of relatively high intensity on the side of the rotor where the radial gap is maximum and a field of relatively low intensity on the opposite side where the radial air gap is at a minimum. As a result of the foregoing phenomena, the rotor will seek a stable attitude.

The torquer section of the stator is similar in construction and excitation to the take-off section of the stator. Together, the torquer section of the stator and the take-off section thereof will cause the rotor to seek a stable attitude both radially and axially. The rotor will also seek a neutral or stable angular orientation relative to the two stator sections, because the relative magnetic field intensities of the several pairs of poles will cause the rotor to seek a position where the rotor overlaps the stator sections or the effective area of the air gap is uniform for all pairs of poles.

Concurrently with the elevation of the rotor by the magnetic poles of the torquer and take-off sections of the stator, rotation of the rotor will start due to the eddy currents induced in the side sections 41, 42 of the rotor by the rotating magnetic fields. When the velocity of rotation of the rotor is great enough for the gas bearing to become effective, the motor section 29 of the stator is energized, which accelerates the rotor up to synchronous speed due to the hysteresis characteristics of the central section 40 of the rotor.

When the synchronous speed is reached, the switches 54a, 54b, 54c are thrown to the contacts designated N in FIGURE 7 which removes the capacitors 56a, 56b, 56c from the circuit. When the switches 54a, 54b, 54c, 55a, 55b, 55c are in the N position, excitation current is supplied to the torquer section 28 and the take-off section 30 of the stator, but the elevation forces applied to the rotor by these sections of the stator, during the erection period are no longer present.

Angular acceleration imparted to the rotor 22 thru the magnetic attraction of the field of the motor section 29 of the stator, which has a component of force, which is normal to the axis of rotation of the rotor, will cause the rotor to precess about the gas bearing to a position approximately 90° from the point of application of the force.

FIGURE 8 is a schematic perspective view of the spinning rotor 22, shown in FIGURE 1, with the angular momentum vector H inclined at an angle of 35°–16′ relative to the plane of the X–Y axes.

This is more clearly illustrated in FIGURE 11, which is a side elevational view of the rotor, taken on the line 11—11, FIGURE 8. If an angular acceleration is applied along the axis Z—Z in a plane which is perpendicular to the plane of the drawing, FIGURE 8, the rotor will precess about some axis A—A. The angular momentum vector will try to align itself with the input vector.

Similarly, in FIGURE 9, if an angular acceleration is applied to the rotor along the axis Y—Y, which is perpendicular to the plane of FIGURE 9, the angular momentum vector H will try to align itself with the input vector and the rotor 22 will precess about an axis B—B, which is angularly disposed relative to the axis X—X.

Similarly, as illustrated in FIGURE 10, an angular acceleration applied along the axis X—X will cause the rotor to precess about an axis C—C, which is angularly disposed relative to the Z—Z axis.

The logical conclusion is that a freely spinning rotor which is constrained only by the magnetic field from the stator, which causes the rotor to rotate, can be forced to precess about three substantially orthogonal axes A—A, B—B, C—C, FIGURES 8, 9 and 10 provided three discreet inputs which are mutually perpendicular to one another are applied to the rotor as illustrated in FIGURES 8, 9, and 10. Equal projections of the angular momentum vectors H$a$, H$b$, H$c$ are related to three orthogonal input axes provided the input axes are at equal angular relation relative to the respective angular momentum vectors H$a$, H$b$, H$c$.

To assist in visualizing the angles shown in the drawings, FIGURE 12 represents a cube having sides 59, 60, 61, the length of each of which is equal to 1, the diagonal 62 of the cube extending from one upper corner 63 to the opposite lower corner 64 representing the angular momentum vector. The three edges 59, 60, 61 of the cube which define the origin are considered the input axes.

FIGURE 13 represents a schematic view similar to FIGURE 12, showing the method of determining the angle $\theta$ which represents the angle between the axis 62 of the rotor and the Z—Z axis of the gyro.

In the large triangle 67, which is similar to the smaller triangle 68, the side 70, opposite the angle $\theta$, represents one side of the cube shown in FIGURE 12 equals 1. The base 72 of the large trangle 67 represents the diagonal through the bottom face of the cube shown in FIGURE 12.

Assuming that the length of the sides 60, 61 of the square is 1, the length of the diagonal 72 of the square representing the bottom face of the cube shown in FIGURE 12 is $$\sqrt{1+1}=\sqrt{2}$$

From the large triangle shown in FIGURE 13, the length of the diagonal 62 of the cube between opposite corners thereof is equal to $$\sqrt{\sqrt{2^2+1^2}}$$
$$=\sqrt{2+1}$$
$$=\sqrt{3}$$

The tangent of the angle $\theta$ between the base of the large triangle and the hypotenuse thereof is $$\tan \theta = \frac{1}{\sqrt{2}} = .707$$

$$\theta = 35°\text{–}16'$$

Thus the angle $\theta$ between the diagonal 62, and the side 70 of the cube equals $$\begin{array}{r}90°\\-35°\text{–}16'\\\hline\text{or } 54°\text{–}44'\end{array}$$

The diagonal of the cube is therefore 54°–44′ from any of the edges of the cube as shown in FIGURE 13.

The foregoing explains the need for the accurate positioning of the spin axis of the gyro relative to the axes of the gimbals which support the gyro.

FIGURE 7 is a schematic diagram showing how the take-off windings are electrically connected to generate the take-off signals, and how torque is applied to the gyro rotor 22 by means of the torquer winding.

54$a$–54$c$, 55$a$–55$c$ ($S_1$–$S_6$) are the switches hereinbefore described, which are used to change from the erection mode of operation to the normal mode.

The function of the capacitors 56$a$–56$c$, 57$a$–57$c$ in the erection mode of operation was also previously described.

The left-hand section 41 of the rotor is shown between the primary excitation coils 48, 48$a$, 49, 49$a$, 50, 50$a$ and the secondary (input) coils 76, 76$a$, 77, 77$a$, 78, 78$a$ of the torquer windings.

The right-hand section 42 of the rotor is shown schematically between the primary excitation coils 45, 45$a$, 46, 46$a$, 47, 47$a$ and the secondary signal output coils 81, 81$a$, 82, 82$a$, 83, 83$a$. The two sections 41, 42 of the rotor are connected by dashed lines to indicate that they are mechanically joined by the central section of the rotor.

It should be noted that edges of the side section 42 of the rotor are symmetrically disposed relative to the excitation coils 45, 45$a$. In this position, there is equal inductive coupling between the primary coils 45, 45$a$, and the secondary coils 81, 81$a$.

The coils are differentially connected to give zero voltage output when the side section 42 of the rotor is in the neutral position shown in FIGURE 7 and will generate a phase sensitive output for any other position. This device is well known in the art as a differential transformer.

The coils 45 and 81 are wound on the same pair of poles at one location on the stator, as shown in FIGURE 4, and the coils 45$a$ and 81$a$ are also wound on a pair of poles 180° removed from the poles 48, 48$a$.

Movement of the side section 42 of the rotor about an axis normal to the spin axis of the rotor will cause a change in inductive coupling between the rotor and the stator. The inductive coupling will increase on one side of the stator and decrease on the other side thereof. A take-off signal will be generated which defines the direction and magnitude of the precession of the rotor from its normal axis of rotation.

The three take-offs 81, 82, 83 function in an identical manner, and because of their geometric locations relative to the rotor, it is possible to generate an output signal at one of the take-off points, while negligible output signals are received from the other two take-off points. Motion of the rotor that is substantially normal to the stator at the take-off point selected for observation results in tangential indications at the other two take-off locations which are angularly displaced by 120° from the selected take-off location in the common plane and 90° removed from the selected take-off location in three-dimensional space.

The torquer sections 28 of the stator are physically similar to the take-off sections 30 thereof, the only difference being in the size of the wire and the number of turns in the secondary windings 76, 76$a$, 77, 77$a$, 78, 78$a$ shown in FIGURE 7. Current supplied to these windings from a command source produces a torque in the spinning rotor 22. The direction of the torque is determined by the portion of the torquer section which receives the signal, and the magnitude of the torque generated is proportional to the product of the current in the primary and secondary windings. The foregoing is characteristic of differential transformers used for this purpose which are well known in the art.

Application of a torque to a spinning rotor will cause precession of the rotor about an axis perpendicular to the torque input axis. The torquer sections are therefore physically displaced relative to the take-off sections by 120° in one plane of the rotor and 90° in three-dimensional space.

The gyro configuration described is capable of: reaction to three discrete angular accelerations when the orthogonal axes of the input torques are properly oriented relative to the spin axis; precession about one of the three orthogonal axes and the concurrent generation of a phase sensitive output signal proportional to the angular displacement about the precession axis; and sensible responses to three discrete torquer input signals.

The gyro hereinbefore described will also sense accelerations about the spin axis.

The rotor itself has inertia, and a change in angular velocity must result from an angular acceleration about the spin axis.

Before this change in velocity can take place, three phase sensitive signals will be generated by the three take-off windings, indicating an acceleration or a deceleration of the rotor spin velocity.

For conventional two axis application the gyro is gimballed so that the spin axis is normal to the plane of the sensitive axes. Two of the three take-off windings may be connected in series to give a single output, whereas the third take-off winding responds in the manner hereinbefore described. Two of the torquer windings may also be connected in series to torque the rotor about one axis, whereas the third torquer winding torques the rotor about an axes at 90° to the first axis as hereinbefore described.

Although but one preferred embodiment of the invention has been illustrated and described, it will be apparent to those skilled in the art that many changes may be made in the preferred two-axis gas bearing gyro as illustrated and described without departing from the spirit and scope of this invention. Accordingly, this invention is to be considered as being limited only by the following claims appended thereto.

What I claim is:
1. A gyroscopic device comprising:
a stator assembly of generally spherical contour fixedly mounted with respect to a particular one of its diameters and including three individual circular stators coaxially disposed with respect to said one diameter, the intermediate stator being symmetrically disposed with respect to a plane perpendicular to said diameter at the center of said spherical contour, the other stators being symmetrically disposed with respect to said plane;
a rotor assembly in the form of a hollow symmetrically-truncated sphere concentrically disposed about said stator assembly and defining therewith uniform clearance gaps of spherical contour between its inner surface and the peripheral surfaces of said stators, said rotor assembly including an equatorial segment, circumscribing said intermediate stator and constituting a hysteresis ring, flanked by symmetrical spherical segments of material characterized by high magnetic permeability and low hysteresis;
means for energizing said intermediate stator to generate an electromagnetic flux field co-active with said hysteresis ring to impart rotational motion to said rotor assembly;
means to energize one of said other stators to generate an electromagnetic flux field co-active with one of said high permeability rotor segments to detect angular displacement of the rotor assembly about an axis perpendicular to said diameter; and
means responsive to said angular displacement of the rotor assembly to energize the other of said stators to generate an electromagnetic flux field co-active with the other of said high permeability rotor segments to exert a force on said rotor assembly opposing said displacement.

2. A gyroscopic device according to claim 1 including:
a gas-tight housing enclosing said rotor and stator assemblies and a body of gas; and
compression pockets uniformly distributed about the peripheral surface of each of said stators co-acting with said inner surface of the rotor assembly and the gas enclosed within said housing to define a hydrodynamic gas bearing for supporting said rotor assembly concentrically on said stator assembly for high-speed, low-friction rotation.

3. A gyroscopic device according to claim 2, wherein each of said stators includes a core peripherally slotted to receive coil windings and form pole pieces, said compression pockets being disposed in the faces of the pole pieces in communication with respective winding slots therebetween.

4. A gyroscopic device comprising:
a stator assembly of generally spherical contour fixedly mounted with respect to a particular one of its diameters and including three individual circular stators coaxially disposed with respect to said one diameter, the intermediate stator being symmetrically disposed with respect to a plane perpendicular to said diameter at the center of said spherical contour, the other stators being symmetrically disposed with respect to said plane and having polyphase inductive coil windings symmetrically distributed about their respective peripheries;
a rotor assembly in the form of a hollow symmetrically-truncated sphere concentrically disposed about said stator assembly and defining therewith uniform clearance gaps of spherical contour between its inner surface and the peripheral surfaces of said stators, said rotor assembly including an equatorial segment, circumscribing said intermediate stator and constituting a hysteresis ring, flanked by symmetrical spherical segments of a material characterized by high magnetic permeability and low hysteresis; and
means to energize said other stators to generate an electromagnetic flux field co-active with said high permeability rotor segments to support said rotor assembly in substantially concentric relation to said stator assembly, said means including capacitive means, in series with each of said coil windings, having capacitive reactance equal to the inductive reactance of said windings when said clearance gaps are at a predetermined maximum value.

5. A gyroscopic device according to claim 4 including:
means for energizing said intermediate stator to generate an electromagnetic flux field co-active with said hysteresis ring to impart rotational motion to said rotor assembly; and
means for disabling said capacitive means upon the attainment of a predetermined rotational speed by said rotor assembly.

6. A gyroscopic device comprising:
a hollow shaft;
a stator assembly of generally spherical contour fixedly mounted on said shaft with one of its diameters coinciding with the longitudinal axis of said shaft, said stator assembly including three individual annular stators coaxially disposed with respect to, and axially spaced along, said shaft, the intermediate stator being symmetrically disposed with respect to a plane perpendicular to said diameter at the center of said spherical contour, the other stators being symmetrically disposed with respect to said plane, each of said other stators including a core peripherally slotted to receive, and containing, polyphase inductive coil windings;
a rotor assembly in the form of a hollow, symmetrically-truncated sphere concentrically disposed about said stator assembly and defining therewith uniform clearance gaps of spherical contour between its inner surface and the peripheral surfaces of said stators, said rotor assembly including an equatorial segment, circumscribing said intermediate stator and constituting a hysteresis ring, flanked by symmetrical spherical segments of a material characterized by high magnetic permeability and low hysteresis;
means for energizing said intermediate stator to generate an electromagnetic flux field co-active with said hysteresis ring to impart rotational motion to said rotor;

means to energize one of said other stators to generate an electromagnetic flux field co-active with one of said high permeability rotor segments to detect angular displacement of the rotor about an axis perpendicular to said diameter; and means responsive to said angular displacement of the rotor to energize the other of said stators to generate an electromagnetic flux field co-active with the other of said high permeability rotor segments to exert a force on said rotor opposing said displacement.

7. A gyroscopic device according to claim 6 wherein the electromagnetic flux fields generated by said other stators are sufficient under predetermined rates of current flow through the winding of said other stators to support said rotor assembly in concentric relation to said stator assembly with said clearance gaps at a substantially uniform maximum value, said device further comprising:

capacitor means, in series with each of the coil windings of said other stators, having a capacitive reactance respectively equal to the inductive reactance of said windings when the clearance gaps are at said uniform maximum value; and switch means selectively operable to render said capacitors inoperative when said rotor assembly has attained a predetermined rotational speed.

8. A gyroscopic device according to claim 7 including:

a gas-tight housing enclosing said rotor and stator assemblies and a body of gas; and compression pockets uniformly distributed about the peripheral surface of each of said stators co-acting with said inner surface of the rotor assembly and the gas enclosed within said housing to define a hydrodynamic gas bearing for supporting said rotor assembly on said stator assembly when the rotor assembly has attained said rotational speed.

References Cited by the Examiner
UNITED STATES PATENTS

| | | | |
|---|---|---|---|
| 2,700,739 | 1/55 | Orlando | 310—166 |
| 2,729,106 | 1/56 | Mathieson | 74—5.7 |
| 2,945,643 | 7/60 | Slater | 244—14 |
| 3,025,708 | 3/62 | Slater et al. | 74—5.46 |
| 3,029,647 | 4/62 | Picardi et al. | 74—5.37 |
| 3,048,043 | 8/62 | Slater et al. | 74—5 |

BROUGHTON G. DURHAM, *Primary Examiner.*

ARTHUR M. HORTON, SAMUEL FEINBERG,
*Examiners.*